United States Patent
Suganuma

(10) Patent No.: US 6,289,321 B1
(45) Date of Patent: Sep. 11, 2001

(54) DEVICE TO DETECT STOCK NAMES HAVING THE HIGHEST CURRENT VALUE AND ITS METHODS FOR USE

(76) Inventor: Shigeru Suganuma, 4-8-2, Fujimi-cho, Higashimurayama-shi Tokyo 189-0024 (JP)

( * ) Notice: Subject to any disclaimer, the term of this patent is extended or adjusted under 35 U.S.C. 154(b) by 0 days.

(21) Appl. No.: 09/228,896

(22) Filed: Jan. 11, 1999

(30) Foreign Application Priority Data

Nov. 10, 1998 (JP) .................................................. 10-319605

(51) Int. Cl.[7] .................................................. G06F 15/18
(52) U.S. Cl. ................................ 705/36; 705/35; 705/37; 705/1
(58) Field of Search .................................. 705/37, 35, 36

(56) References Cited

U.S. PATENT DOCUMENTS

| | | | |
|---|---|---|---|
| 5,347,452 | * | 9/1994 | Bay, Jr. . |
| 5,544,281 | * | 8/1996 | Maruoka et al. ........................ 706/58 |
| 5,940,810 | * | 8/1999 | Traub et al. ............................. 705/36 |
| 5,946,666 | * | 8/1999 | Nevo et al. .............................. 705/36 |
| 5,978,778 | * | 11/1999 | O'Shaughnessy ....................... 705/36 |
| 6,012,042 | * | 1/2000 | Black et al. ............................. 705/36 |
| 6,014,643 | * | 1/2000 | Minton ................................... 705/37 |

FOREIGN PATENT DOCUMENTS

| | | | |
|---|---|---|---|
| 08197872 | * | 8/1996 | (JP) ................................ B42D/15/00 |
| 410003465 | * | 1/1998 | (JP) ................................ G06F/17/00 |
| 10198646A | * | 7/1998 | (JP) ................................ G06F/15/18 |

OTHER PUBLICATIONS

Fama, E., "Random walks in stock market prices", Financial Analysts Journal, v51n1 pp: 75–80, Jan. 1995.*
Sill, D. Keith, "Predicting stock–market volatility", Business Review, pp: 15–27, Jan. 1993.*
Baldwin, William, "The impossible dream; Wall street's fortune–tellers say they can time their way around bear markets", Forbes, v134,p144(6), Oct. 1984.*
Fisher, Kenneth L., "Bull in bull markets (using Elliott Wave theory to predict Dow Jones Industrial Average)", Forbes, v139, p186(1), Apr. 1987.*
Cochran, Steven J., "International Evidence on the predictability of stock returns", The Financial News, vol. 28, No. 2, May, 1993.*
Fuller et al., "Can Regression–Based Models predicts stock and bonds returns?", The Journal of Portfolio Management, Mar. 1994.*
Petro et al., "Time Series Models for predicting earnings per share", The Journal of Business Forcasting. p. 15–17, Sep. 1989.*

* cited by examiner

*Primary Examiner*—James P. Trammell
*Assistant Examiner*—Tongoc Tran
(74) *Attorney, Agent, or Firm*—Frishauf, Holtz, Goodman, Langer & Chick, P.C.

(57) ABSTRACT

There is disclosed a method for selecting a stock name having the highest current value or lowest current value from all the stock names in stock/exchange/merchandise trading and distributing the stock name to investors. Each moving tendency value calculated with a short-term interval p+1 and further interval 2p+1, 4p+1, 8p+1, 16p+1 is standardized, its central portion is divided/set into a division for letting trading go by, a high-value division F, F2, F3, F4, F5=H, and a low-value division F, F2, F3, F4, F5=L, and a fluctuation of a tendency value curve of a stock price locus leading to the current value is synthesized/indicated as F5+F4+F3+F2+F. At the present point of time when an approach signal or an extreme value signal $T_U$, $X_U$ is detected and the division shifts to F, F2, F3, F4, F5=H, the stock name is transmitted/distributed as a stock name having the extreme value with a long ascending time. Alternatively, at the present point of time when an approach signal or an extreme value signal $T_L$, $X_L$ is detected and the division shifts to F, F2, F3, F4, F5=L, the stock name is transmitted/distributed as a stock name having the extreme value with a long descending time.

4 Claims, 15 Drawing Sheets

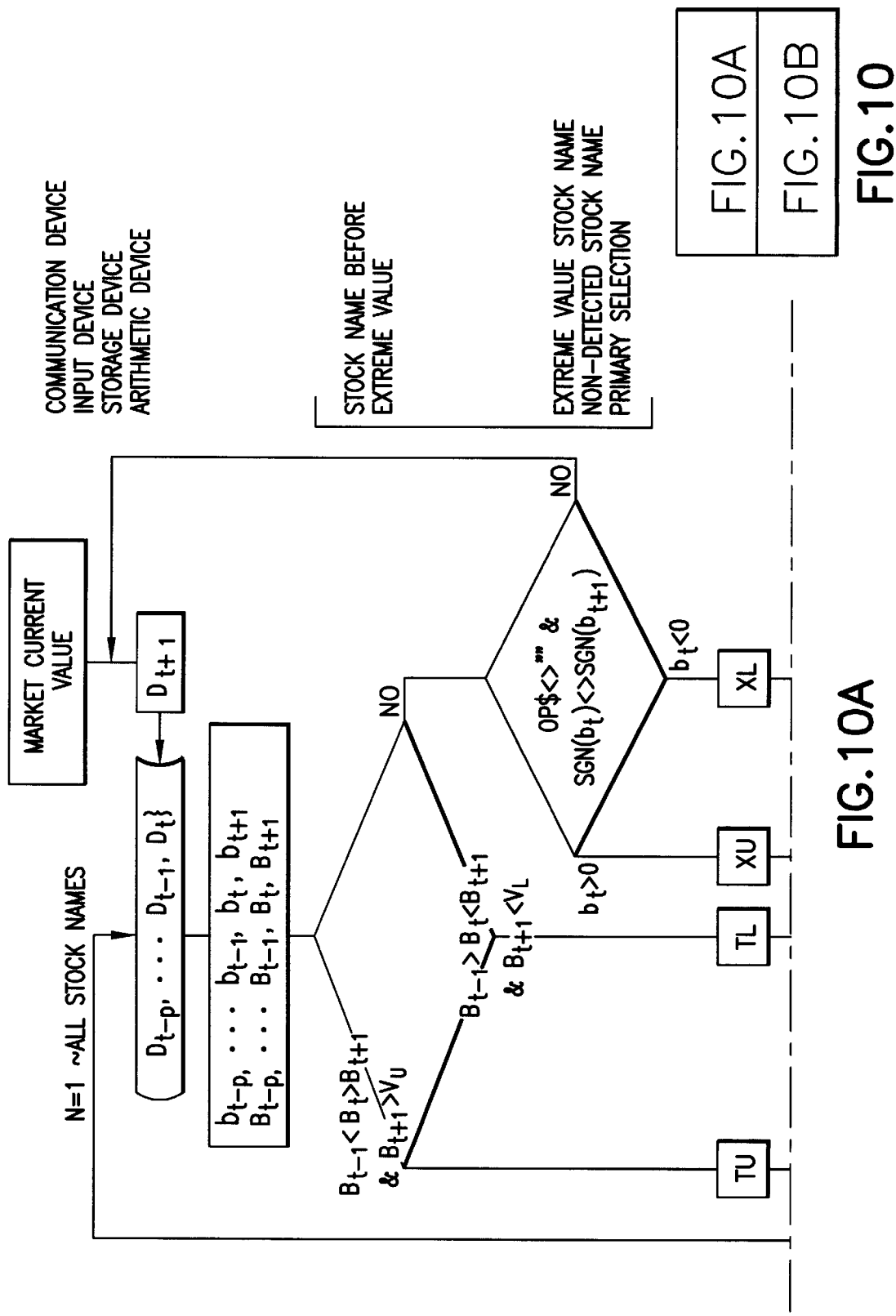

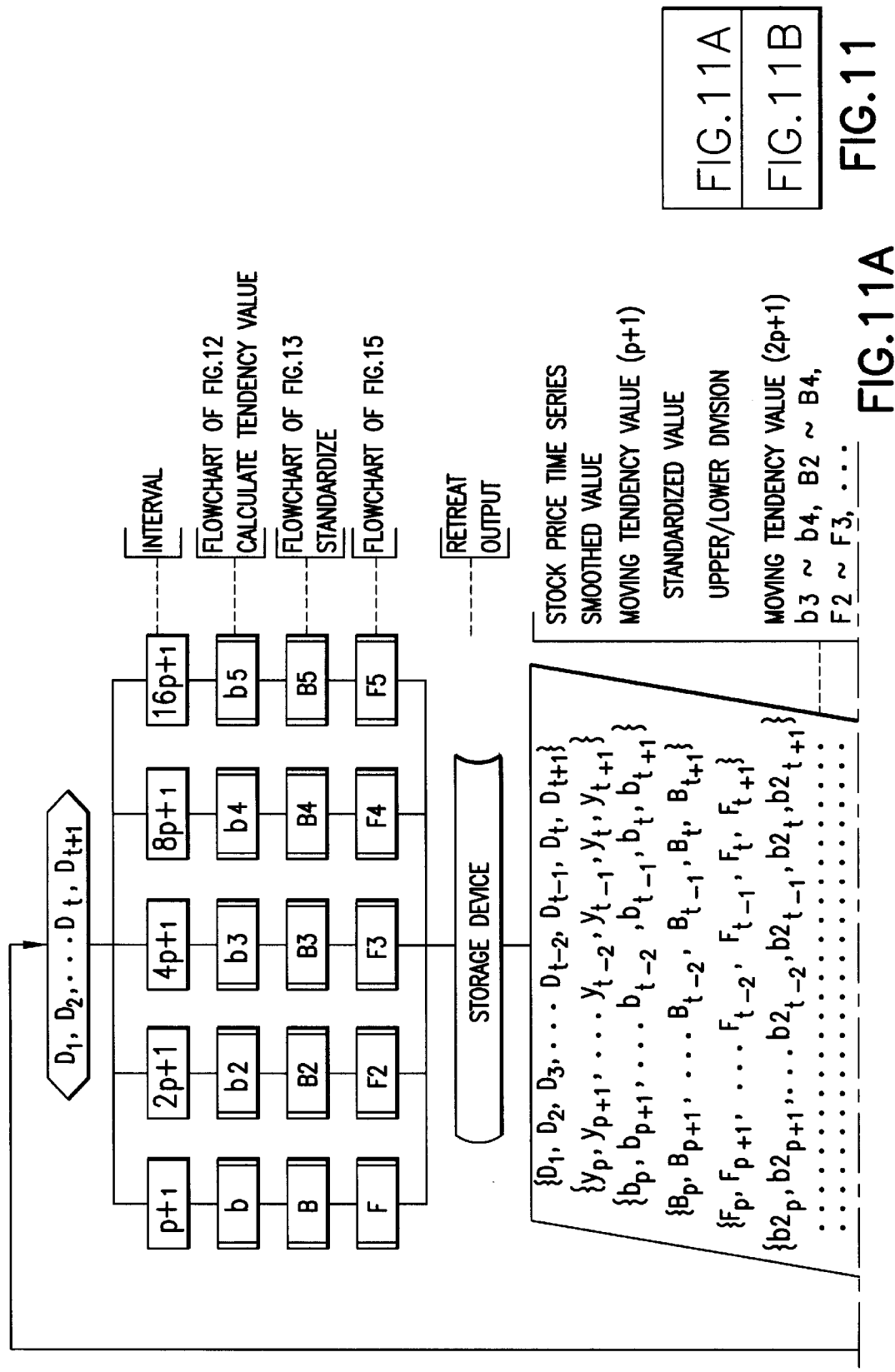

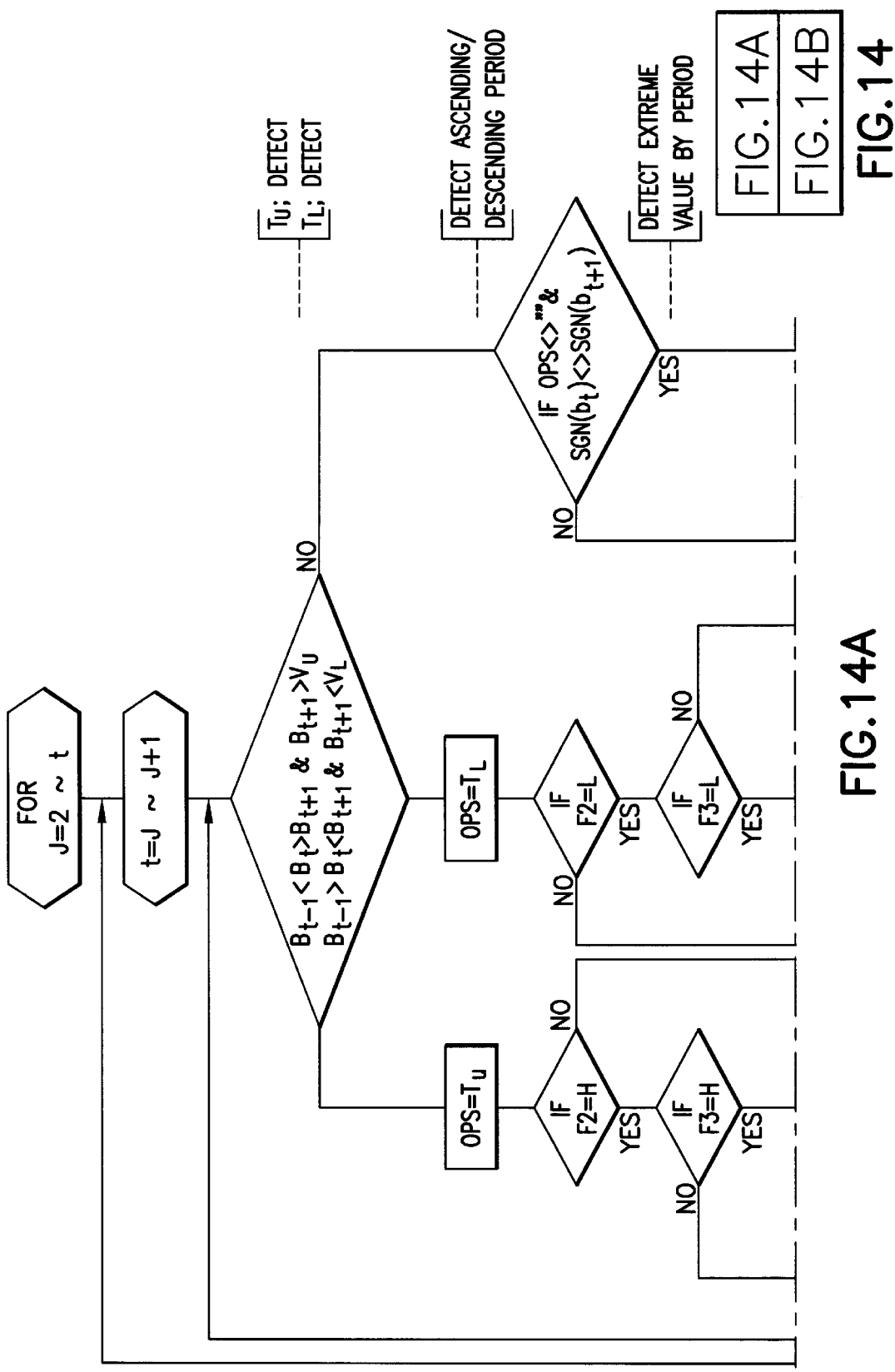

DEVICE TO DETECT STOCK NAMES HAVING THE HIGHEST CURRENT VALUE AND ITS METHODS FOR USE

REFERENCE TO RELATED APPLICATION

The present application claims a priority based on Japanese Patent Application No. 319605/1998 filed on Nov. 10, 1998 under the provision of 35 U.S.C 119.

BACKGROUND OF THE INVENTION

1. Field of the Invention

The present invention relates to a method for detecting stock names each of which has the highest or lowest current value as the latest market trading numeric value, and operating transmission media to inform specified individual or institutional investors of any detected stock name at the time of stock investment/exchange/merchandise trading.

2. Description of the Related Arts

Terms for use in the present invention are defined as follows:

Market; stock, exchange, merchandise market

Stock price; a price, exchange rate or index established in the market

Current value; the latest stock price

Present point of time; point of time corresponding to the current value

Stock name; a stock, currency, merchandise names traded in the market

Extreme value; a numeric value of a place where a tangent line of a stock price curve becomes horizontal, a neighboring maximum or minimum value Approach signal; a signal immediately before a current value reaches a extreme value Interval; a range of time series of stock prices According to investment principle that maximum profits be obtained from minimum costs, attempts have been made to target for an investment object and action timing. Analysts study fundamental conditions, and provide prospective stock names to invest in via various information media. However, there is provided little information concerning investment timings, i.e., stock names which can be bought at the lowest current value and stock names which are to be sold at the highest current value. Many proposals have seemingly been presented for technical analysis to provide such information. Examples of typical indicators include Granville's moving average value, Eliot's wave theory, a psychological line, a volume ratio, a dissociation ratio from a moving average line, and other various methods (Reference Document 1).

In the conventional technical analysis, like in Grandville's theory, it is supposed that after a certain pattern is formed, the pattern is guided to one future pattern. It is difficult to determine which pattern the current value belongs to or when the pattern is formed. Additionally, in many cases, when the pattern is confirmed, the timing is already lost.

The individual or institutional investors have to constantly read a tendency of the current value, foresee its changing point, and select selling, buying or letting a trade go by. The investors concentrate themselves on whether or not the investment object being watched continues to ascend and reaches the highest price or whether or not it continues to descend and reaches the bottom price. In other words, it is now the most important thing to identify the stock name taking the extreme value at the present point of time, which cannot be realized in the conventional art. It is said in the business world that heads and tails be given away, and the pursuit of the extreme value is given up in the conventional art.

Also in the conventional researches, it is almost impossible to forecast future stock prices from stock price time series results (Reference Documents 2, 3). The stock price in the market is established between parties holding contradictory views regarding the way of selling/buying, i.e., the way of foreseeing the future stock price. If the price is lowered excessively, buying is performed. If it is raised excessively, selling is performed. If there is no fundamentally large fluctuation, the stock price returns/moves to its mean value.

Under the circumstances that the future of the stock prices cannot be predicted by the technical analysis, an effective investment attitude is to buy a stock name whose current value drops to its bottom and sell the stock name when its current value reaches its highest value. As described above, a method has not been developed for grasping a stock name having an approach signal to a stock name having the extreme value at the present point of time and detecting such stock names from a group consisting of all stock names. What is most demanded is to provide the investors with the group of stock names selected from more than 3000 domestic stock names and stock names traded in the other markets.

Reference Documents:

1 Technical Analysis of Stock Quotations by Nihon Keizai Shimbun

2 Introduction to "Stock Investment Theory" for Businessman in Securities Company by Nihon Keizai Shimbun 3 Japanese Stock Price Fluctuation (Analysis by Volatility Fluctuation Model) by Toyo Keizai Shinpo 4 Introduction to Time Series Models (TIME SERIES MODELS by A. C. Harvey) by Publishing Association of the University of Tokyo cl SUMMARY OF THE INVENTION In a stock price structure in which a current value indicates an extreme value, a locus of the stock price leading to the current value is first smoothed with a short-term interval.

a) Subsequently, a point of time at which a fluctuated value distinctly ascends (descends) is regarded as an origin. When the value consistently continues to ascend (descend), a point of time at which an acceleration of ascending (descending) turns to zero the highest (lowest) value is indicated.

b) In this division, the value is constantly higher (lower) than a locus value at the origin. Therefore, the division is classified as a high-value (low-value) division. When the locus is followed up with a short-term interval, at the present point of time at which the acceleration turns to zero in the high-value (low-value) division the short-term highest (lowest) value is detected.

c) The magnitude of the value difference in which the stock price reaches the extreme value is under the influence of an ascending (descending) angle and an ascending (descending) period of time. To clarify the relationship of these factors and the stock price locus, a stock price moving tendency value leading to the current value is synthesized by combining therewith a N+1 series of the moving tendency value drawn by an interval of N square of 2 of the short-term interval.

The ascending (descending) angle of the stock price is evaluated dependent on the magnitude of each moving tendency value drawn by the interval of N square of 2 of the short-term interval. To intend the value for universal application for each stock name, each numeric value is standardized, and its absolute value exceeding the standardized value is regarded as an object.

For the ascending (descending) period of time before the stock price reaches the extreme value, when tracing back from the present point of time at which the synthesized moving tendency value keep the same positive (negative) sign +(−), the period of time corresponds to the ascending (descending) and the stock price of the present point of time indicates the highest (lowest) value as compared with any point of time during the period of time.

d) The aforementioned is the stock price structure in which the current value indicates the extreme value. Although the current values of all the stock names are thrown in, only the stock names passed through a filter of the structure are taken up.

The locus of the stock price before the current value is reached is as follows:

a) A current value $D_t$ is obtained via broadcasting, communication, printed matters or other media.

b) Time series result values $(D_1, D_2, \ldots D_{t-2}, D_{t-1})$ of the recorded/stored stock price are regenerated/outputted from a hard disc or another storage device.

c) The current value $D_t$ is added to the last term of the time series result values via an input device.

d) Time series data is represented by $\{D_1, D_2, \ldots D_{t-2}, D_{t-1}, D_t\}$.

Basically, $\{D_1, D_2, \ldots D_{t-2}, D_{t-1}, D_t\}$ has between lags 1 a structure relationship of $(D_t - \mu) = b_t * (D_{t-1} - \mu) + \epsilon_t$ (t=t, t−1 . . . 3, 2) respectively, in which:

$b_t, \mu$: parameter, and $\epsilon_t$: error

Each time series numeric value comprises the tendency value $b_t$ and error term $\epsilon_t$ added thereto. The tendency value $b_t$ is regarded as a smooth function according to the term (Reference Document 4).

Smoothing is performed by the least square method in order to eliminate the irregularity of the numeric value attributed to the error term. As shown in FIG. 2, the tendency value $b_t$ and a smoothed value $y_t$ are obtained from a regression line in a range of p+1 time series of $\{D_t, D_{t-1}, \ldots D_{t-p}\}$.

Subsequently, a tendency value $b_{t-1}$ and a smoothed value $y_{t-1}$, are obtained in a range of $\{D_{t-1}, D_{t-2} \ldots D_{t-p-1}\}$. The operation is further repeated t=t−2, t−3, . . . p+1. The interval p+1 is regarded as a short-term, and usually p+1=3 to 7 is used.

In a procedure shown in a flowchart of FIG. 12, followings are obtained:

$\{y_t, y_{t-1}, \ldots y_{p+1}\}$; time series smoothed numeric values, and its curve y;

$\{b_t, b_{t-1}, \ldots b_{p+1}\}$; time series of short-term moving tendency values, and its curve b; and $\{D_t, D_{t-1}, \ldots D_{p+1}\}$; time series of Raw stock price, and its curve D. A relationship of the above three curves is shown in FIG. 5. Similarly, in the procedure of the flowchart of FIG. 12, time series $\{b2_t, b2_{t-1}, \ldots b2_{2p+1}\}$, and its curve b2 is calculated using $2^{nd}$ interval 2p+1;

$\{b3_t, b3_{t-1}, \ldots b3_{4p+1}\}$; moving tendency value curve b3 is calculated using $3^{rd}$ interval 4p+1;

$\{b4_t, b4_{t-1}, \ldots b4_{8p+1}\}$; moving tendency value curve b4 is calculated using $4^{th}$ interval 8p+1; and $\{b5_t, b5_{t-1}, \ldots b5_{16p+1}\}$; moving tendency value curve b5 is calculated using $5^{th}$ interval 16p+1.

In order to eliminate the influence of seasonal fluctuation or circulating fluctuation factors, for example, in terms of days, the short-term interval p+1 is set to five days forming one week. Specifically, the $2^{nd}$ interval 2p+1 is set to nine days. The $3^{rd}$ interval or subsequent interval is determined by (previous interval−1)*2+1. The $4^{th}$ interval or the $5^{th}$ interval is determined in this manner.

The extreme value of the curve y is in the position of zero of a first order differential curve, but the first order differential curve is prepared in one way using the curve b of the short-term moving tendency value. In FIG. 2, the curve b corresponds to the first order differential curve of the curve y with a lag p/2. Specifically, each point of time shifted back from the present point of time by p/2 indicates the point tendency value of the curve y. Similarly, the point tendency value of the curve y is indicated at each point of time shifted back from the present point of time by p for the curve b2, 2*p for the curve b3, 2*2*p for the curve b4 and by 2*2*2*p for the curve b5.

FIG. 3 shows a relationship of the short-term moving tendency value and the moving tendency value curves of $2^{nd}$ to $5^{th}$ intervals. The content of the curve b5 with the macro fluctuation of the stock price smoothed curve y is indicated by the curve b4. Furthermore, the curves b3, b2 or details are overlapped. The curve b of the short-term moving tendency value indicates most local fluctuation. In other words, the curve b faithfully represents the local tendency of the curve y. When shifting to the curve b2, b3, b4, b5, a micro point of view shifts to a macro field of view.

FIG. 4 is an enlarged partial view of the tendency value curve of FIG. 3. The tendency values from b5E of the curve b5, b4E of the curve b4, b3E of the curve b3 and b2E of the curve b2 to the present point of time are unknown. A relationship of b4S, dropped from b5E onto the curve b4, and b4E is changed to a relationship of b5E and b4E. Similarly, a relationship of b3S, dropped from b4E onto the curve b3, and b3E turns to be a relationship of b4E and b3E. A relationship of b3E and b2E, and a relationship of b2E and bE are also determined in the same manner. A transition of the tendency value to the present point of time is like b5E, b4S to b4E, b3S to b3E, b2S to b2E, to bS to bE. An origin of the curve b of bS to bE is b2E of the curve b2, while an origin of the curve b2 of b2S to b2E is b3E of the curve b3. In a range in which the transition line goes back from the present point of time and its positive (negative) sign +(−) is unchanged, when the stock price curve y consistently remains ascends (descends) to reach the present point of time.

The each locus of the stock price indicates the behavior peculiar of itself. Each fluctuation of each stock name is standardized so as to be universally applied to all the stock names. The moving tendency values derived from the time series stock price are standardized in such a manner that a mean is zero and standard deviation is one. The ascending (descending) angle of the stock price is the tendency value itself. Only the division in which the standardized tendency value exceeds (lowers below) the standard is set as the high-value (low-value) division. For the standard for use, one standard deviation is set to the upper dividing line $V_U$ (lower dividing line $V_L$).

In a procedure of a flowchart of FIG. 13, short-term moving tendency values $\{b_t, b_{t-1}, \ldots b_1\}$ are standardized to obtain a standardized curve B of $(B_t, B_{t-1} \ldots B_1\}$.

FIG. 5 shows the stock price curve y and the standardized curve B with time series along abscissa and standard deviation as measure along ordinate. A local change in tendency value leading to $B_{t-3}$, $B_{t-2}$, $B_{t-1}$, $B_t$ is emphasized/represented as acceleration of the curve y. A point of time at which the locus reaching $B_t$ exceeds (lowers below) the upper dividing line $V_U$ (lower dividing line $V_L$) is set to the origin. A period of time from when the locus further increases (decreases), reverses and decelerates (accelerates)

until the tendency value b turns to zero is defined as a short-term high-value division F=H (low-value division F=L). The locus of the stock price consistently ascends (descends) from the origin and reaches the extreme value at the final point of time of F=H(L). When a point of time at which $B_t$ reaches from the high-value division F=H of the standardized curve B to the tendency value $b_t=0$ is set to $X_U$, $Y_{t-2/p}$ of the curve y indicates upper extreme value. When a point of time at which $B_t$ reaches from the division F=L to $b_t=0$ is set to $X_L$, $Y_{t-2/p}$ of the curve y indicates lower extreme value. Subsequently, after the standardized curve B goes back and exceeds the upper dividing line $V_U$ (lower dividing line $V_L$), its returning point of time $T_U$ ($T_L$) is detected as an approach signal immediately before the curve y reaches the extreme value.

A curve b2 of $\{b2_t, b2_{t-1}, \ldots b2_{2p+1}\}$ is standardized and converted to a standardized curve B2 of $\{B2_t, B2_{t-1}, \ldots B2_{2p+1}\}$. A period of time from when a locus leading to $B2_t$ exceeds (lowers below) the upper dividing line $V_U$ (lower dividing line $V_L$) to increase (decrease), reverses and decelerates (accelerates) until the tendency value b2 turns to zero is selected as a high-value division F2=H (low-value division F2=L) of the standardized curve B2. FIG. 6 is formed by adding the standardized curve B2 and the selected result F2 to FIG. 5. A selected division $F2_t$ of $B2_t$ is a distinguished division of b2E traced back by p from the present point of time of FIG. 4, and is also an origin of bS to the present point of time.

A curve b3 of $\{b3_t, b3_{t-1}, \ldots b3_{4p+1}\}$ is standardized and converted to a standardized curve B3 of $\{B3_t, B3_{t-1}, \ldots B3_{4p+1}\}$. Similarly, a curve b4 of $(b4_t, b4_{t-1}, \ldots b4_{8p+1}\}$ is standardized and converted to a standardized curve B4 of $\{B4_t, B4_{t-1}, \ldots B4_{8p+1}\}$, and a curve b5 of $\{b5_t, b5_{t-1}, \ldots b5_{16p+1}\}$ is standardized and converted to a standardized curve B5 of $\{B5_t, B5_{t-1}, \ldots B5_{16p+1}\}$.

A period of time from when a locus leading to $B3_t$, $B4_t$, $B5_t$ exceeds (lowers below) the upper dividing line $V_U$ (lower dividing line $V_L$) to increase (decrease), reverses and decelerates (accelerates) until the tendency value b3, b4, b5 turns to zero is selected as a high-value division F3, F4, F5=H (low-value division F3, F4, F5=L) of the standardized curve B3, B4, B5.

FIG. 7 is formed by adding the standardized curves B3, B4, B5 and selected results F3, F4, F5 to FIG. 6. A selected division $F3_t$, $F4_t$, $F5_t$ of $B3_t$, $B4_t$, $B5_t$ is a distinguished division of b3E, b4E, b5E traced back by 2p, 4p, 8p from the present point of time of FIG. 4, and is also an origin of b2S to b2E, b3S to b3E, b4S to b4E.

When the signal $T_U$ ($T_L$), $X_U$ ($X_L$) is detected at the present point of time in the high-value division $F2_t$=H (low-value division $F2_t$=L), the signal $T_U$ ($T_L$), $X_U$ ($X_L$) has passed at least an ascending (descending) period of time of p before reaching the present point of time. The signals $T_U$ ($T_L$) and $X_U$ ($X_L$) are converted to T1U (T1L) and X1U (X1L), respectively.

Furthermore, in case of $F3_t$=H (low-value division $F3_t$=L), the signal T1U (T1L), X1U (X1L) is converted to T2U (T2L), X2U (X2L) which has passed at least the ascending (descending) period of time of 2*p.

Moreover, in case of $F4_t$=H ($F4_t$=L), the signal T2U (T2L), X2U (X2L) is converted to T3U (T3L), X3U (X3L) which has passed at least the ascending (descending) period of time of 2*2*p.

Additionally, in case of $F5_t$=H ($F5_t$=L), the signal T3U (T3L), X3U (X3L) is converted to T4U (T4L), X4U (X4L) which has passed at least the ascending (descending) period of time of 2*2*2*p.

FIG. 1 shows the aforementioned processes successively in time series. Each numeric value of a term of time series is derived only from results before the term of time series, and successively recorded. The extreme value signals and the approach signals in the past are also detected under the conditions that the point of time corresponds to the last term.

DETAILED DESCRIPTION OF PREFERRED EMBODIMENTS

Figure 10B:
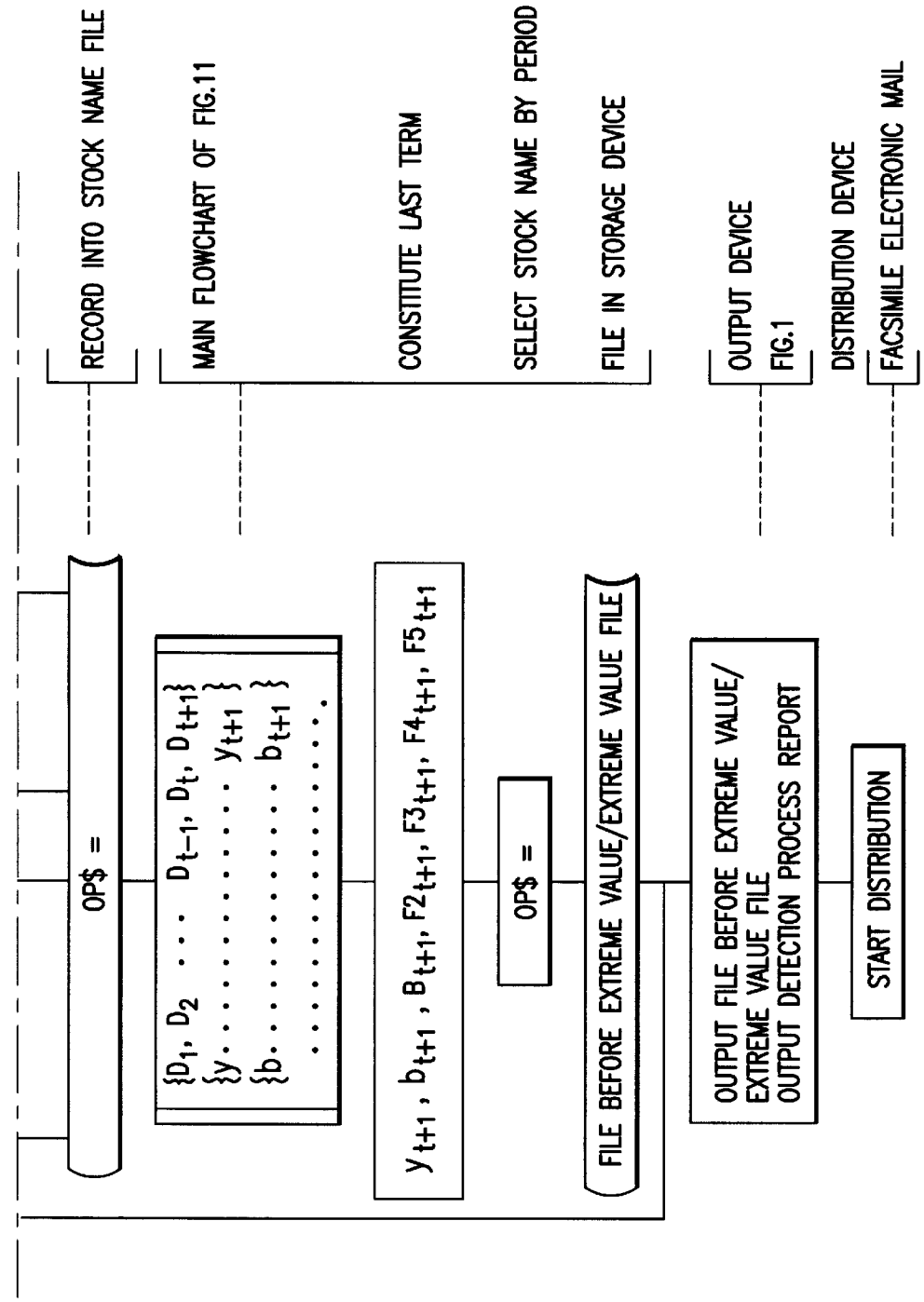
FIG. 10 is a developed view showing structure and function of the present invention.

FIG. 10 shows structure and function flow of the present invention. A current value $D_{t+1}$ of each object stock name obtained via communication or transmission media is added to the last term of a time series $\{D_t, D_{t-1}, \ldots D_1\}$ regenerated/outputted by a storage device to newly constitute ($D_{t+1}, D_t, D_{t-1}, \ldots D_1$). After calculating $b_{t+1}$, $B_{t+1}$ corresponding to the current value $D_{t+1}$, a stock name in which generation of an approach signal ($T_U$, $T_L$) or an extreme value signal ($X_U$, $X_L$) is found is primarily selected from all the stock names of each market. Following a flowchart shown in FIG. 11, a stock name haning the approach signal and a stock name having the extreme value are secondarily detected by ascending (descending) period until the current value is reached. When there are stock names to be detected in the market requested beforehand by the investors or another specific field, printers, facsimile machines or other communication devices are operated to distribute information.

Stock price result time series of $\{D_t, D_{t-1}, \ldots D_1\}$ is outputted beforehand from the storage device. With a short-term p+1 interval, in a procedure of a sub-chart shown in FIG. 12, $\{b_t, b_{t-1}, b_{p+1}\}$ short-term moving tendency values b, average value and standard deviation thereof, as well as $\{y_t, y_{t-1}, \ldots y_{P+1}\}$ stock price smoothed values y are calculated and transmitted again to the storage device.

A short-term tendency value $b_{t+1}$ derived with the short-term interval p+1 from the current value $D_{t+1}$ from an input device and $\{D_t, D_{t-1}, \ldots D_{t-p+2}\}$ outputted from the storage device, and a standardized value $B_{t+1}$ are calculated. A signal OP\$=$T_U$ is detected when the standardized values have a relationship of $B_{t-1}<B_t>B_{t+1}$, $B_t$ exceeds an upper dividing line $V_U$ and its locus is a returning point of a convex. A signal OP\$=$T_L$ is also detected when $B_{t-1}>B_t<B_{t+1}$, $B_t$ lowers below a distinguishing line $V_L$ and its locus is a returning point of a concave. If no signal is detected, OP\$=" " is transmitted to said stock name in the storage device.

Before the present point of time, the approach signal OP\$=$T_U$, OP\$=$T_L$ is detected, but the current value does not yet reach the extreme value. Specifically, at OP\$< >" " of the stock name file fetched from the storage device, a short-term moving tendency value curve b cuts a horizontal line that is the stock name having the extreme value. In case of OP\$=$T_U$, upper extreme value OP\$=$X_U$ is transmitted to said stock name in the storage device. In case of OP\$=$T_L$, lower extreme value OP\$=$X_L$ is transmitted to said stock name in the storage device.

Figure 11B:
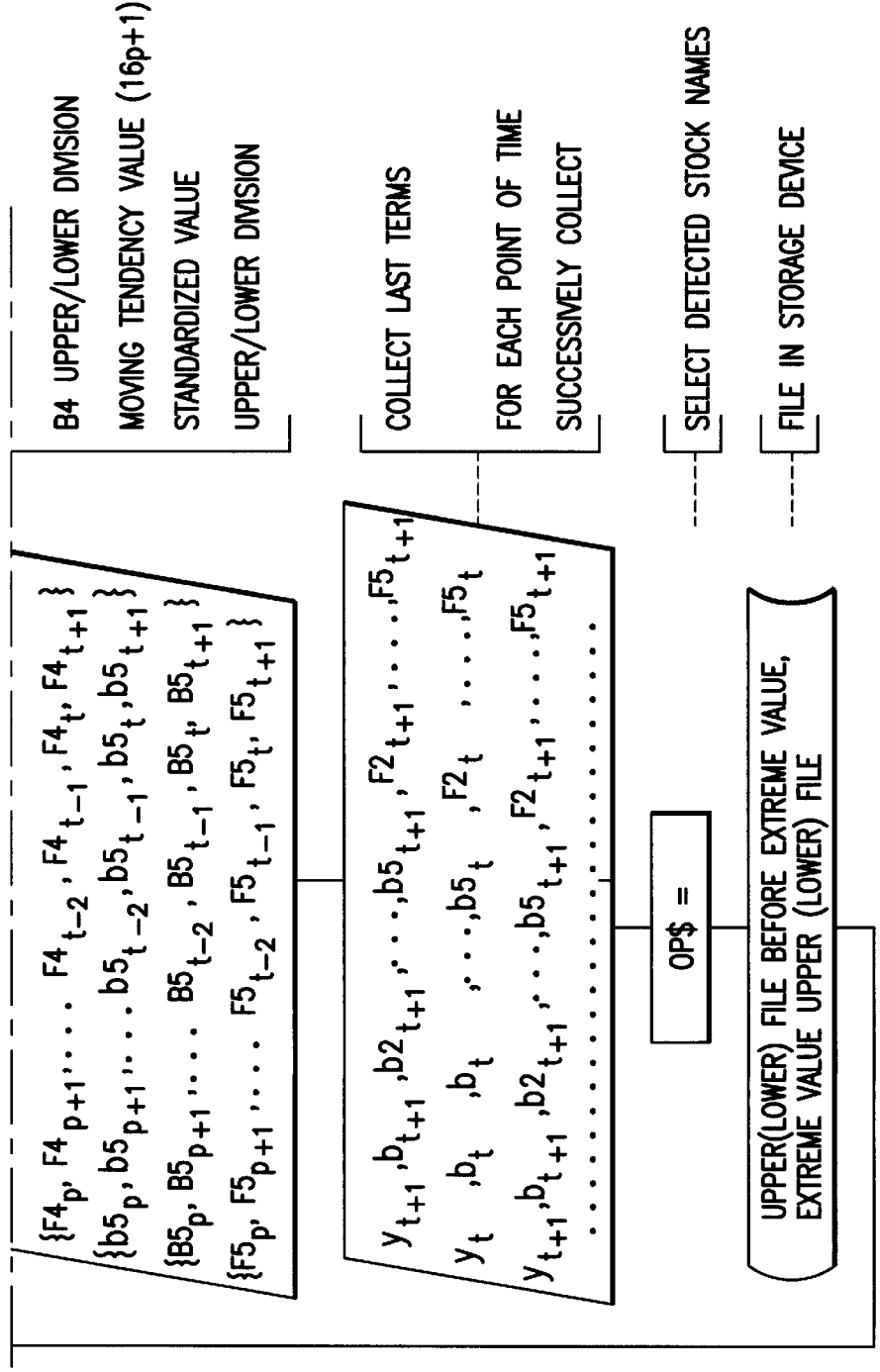
FIG. 11 is a general flowchart of a detecting process.
Figure 12:
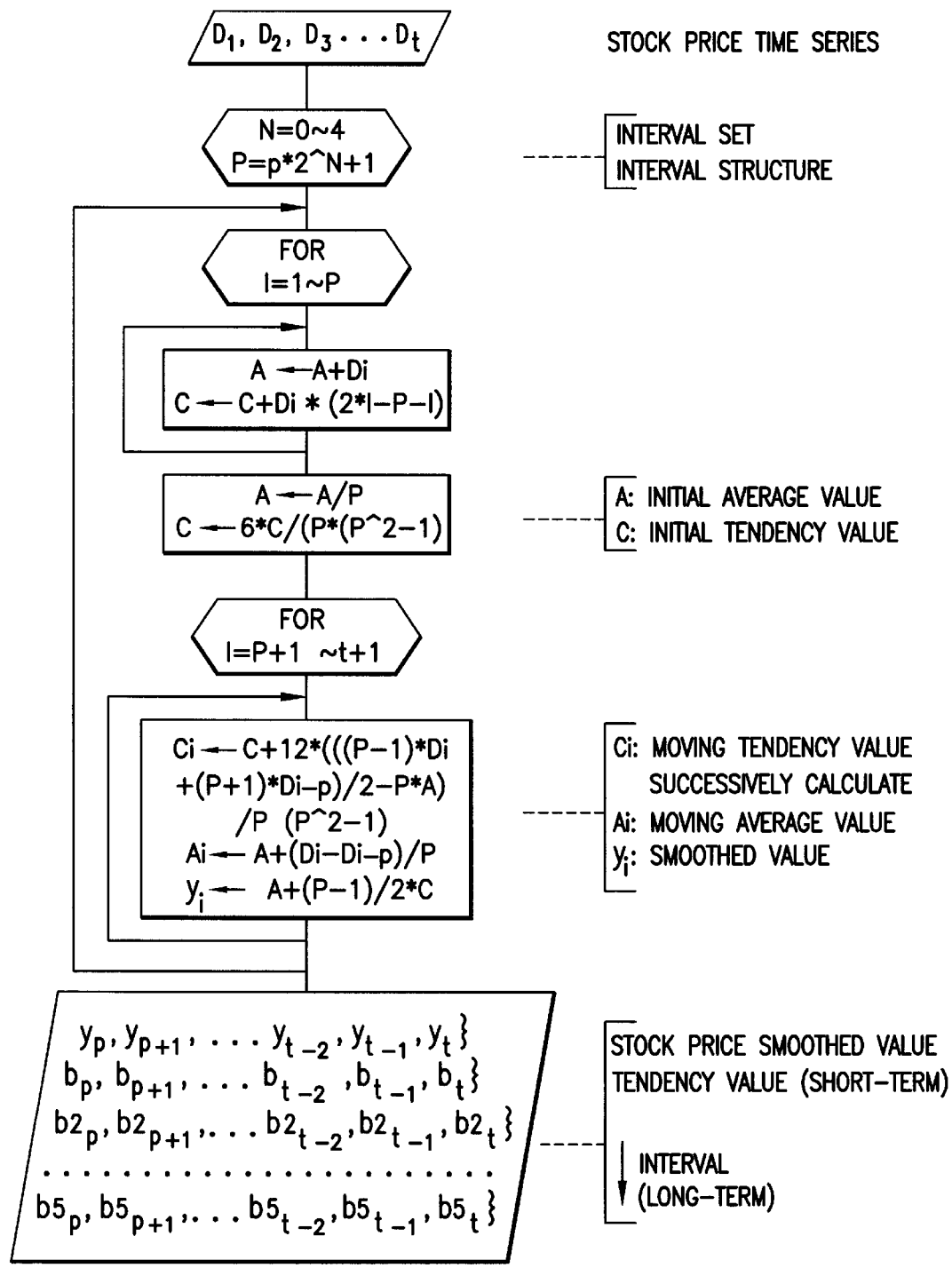
FIG. 12 is a flowchart for calculating the moving tendency value.
Figure 13:
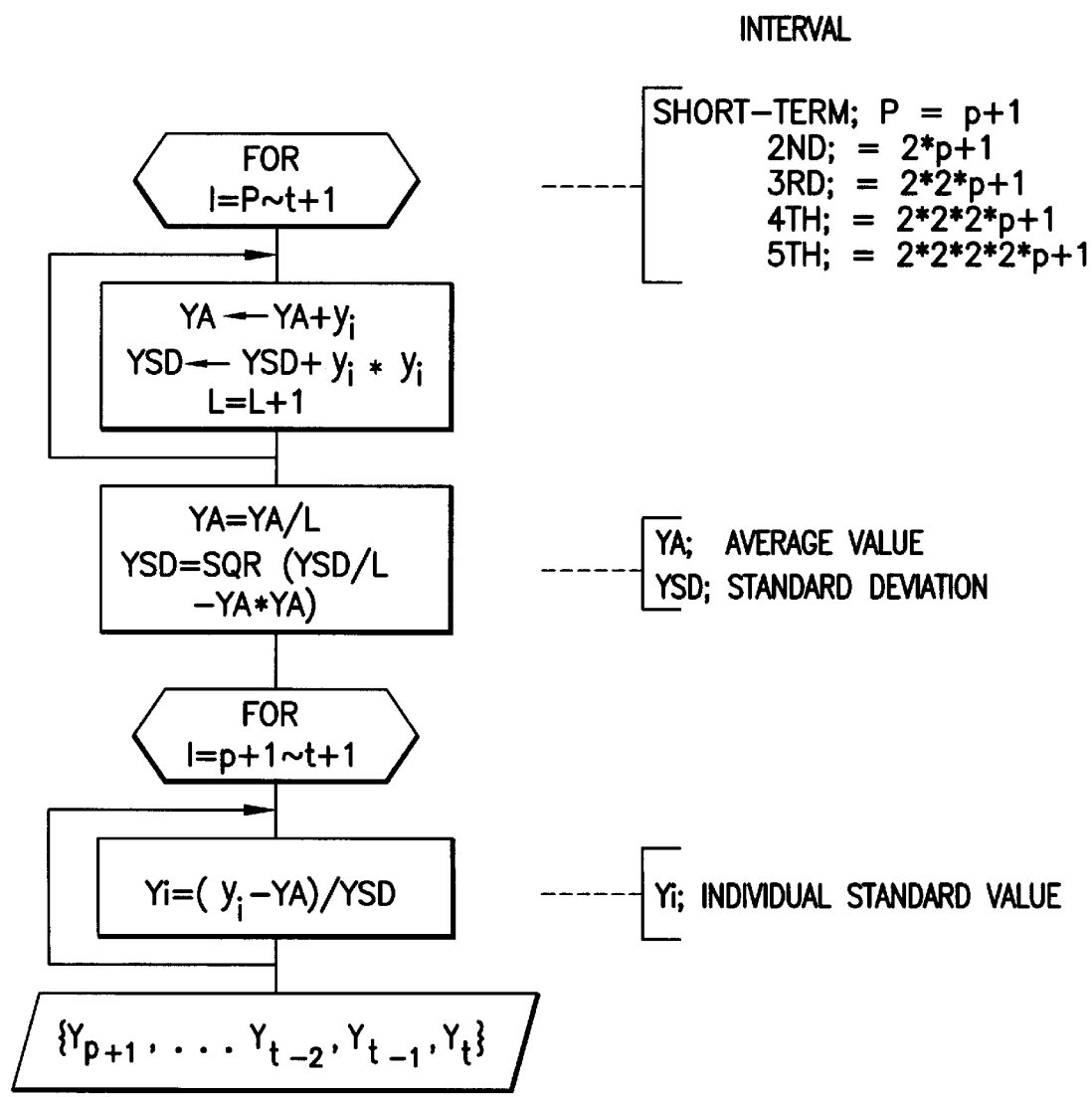
FIG. 13 is a flowchart for standardization.

As described above, for the stock name in which the approach signal $T_U(T_L)$ or the extreme value signal $X_U(X_L)$ has been found in the primary stock name selection, as shown in the main flowchart of FIG. 11, in the procedure shown in the sub charts of FIGS. 12, 13, $\{b_{t+1}, b_t, b_{t-1}, \ldots b_{p+1}\}$ short-term moving tendency values b and $\{B_{t+1}, B_t, B_{t-1}, \ldots B_{p+1}\}$ standardized values B are calculated from $(D_{t+1}, D_t, D_{t-1}, \ldots D_1)$ and then transmitted to the storage device.

Similarly, in the procedure of the sub-charts of FIGS. 12, 13, $\{b2_t, b2_{t-1}, \ldots b2_{2p+1}\}$ curve b2, $\{B2_{t+1}, B2_t, B2_{t-1}, \ldots B2_{2p+1}\}$ standardized values B2 are calculated using $2^{nd}$ interval 2p+1, and transmitted to the storage device. Successively, the same procedure is repeated using $3^{rd}$ interval 4p+1, $4^{th}$ interval 8p+1 and $5^{th}$ interval 16p+1, and followings are calculated and transmitted to the storage device:

$\{b3_{t+1}, b3_t, b3_{t-1}, \ldots b3_{4p+1}\}$ moving tendency values b3;
$\{B3_{t+1}, B3_t, B3_{t-1}, \ldots B3_{4p+1}\}$ standardized values B3;
$\{b4_{t+1}, b4_t, b4_{t-1}, \ldots b4_{8p+1}\}$ moving tendency values b4;
$\{B4_{t+1}, B4_t, B4_{t-1}, \ldots B4_{8p+1}\}$ standardized values B4;
$\{b5_{t+1}, b5_t, b5_{t-1}, \ldots b5_{16p+1}\}$ moving tendency values b5; and
$\{B5_{t+1}, B5_t, B5_{t-1}, \ldots B5_{16p+1}\}$ standardized values B5.

Figure 15:
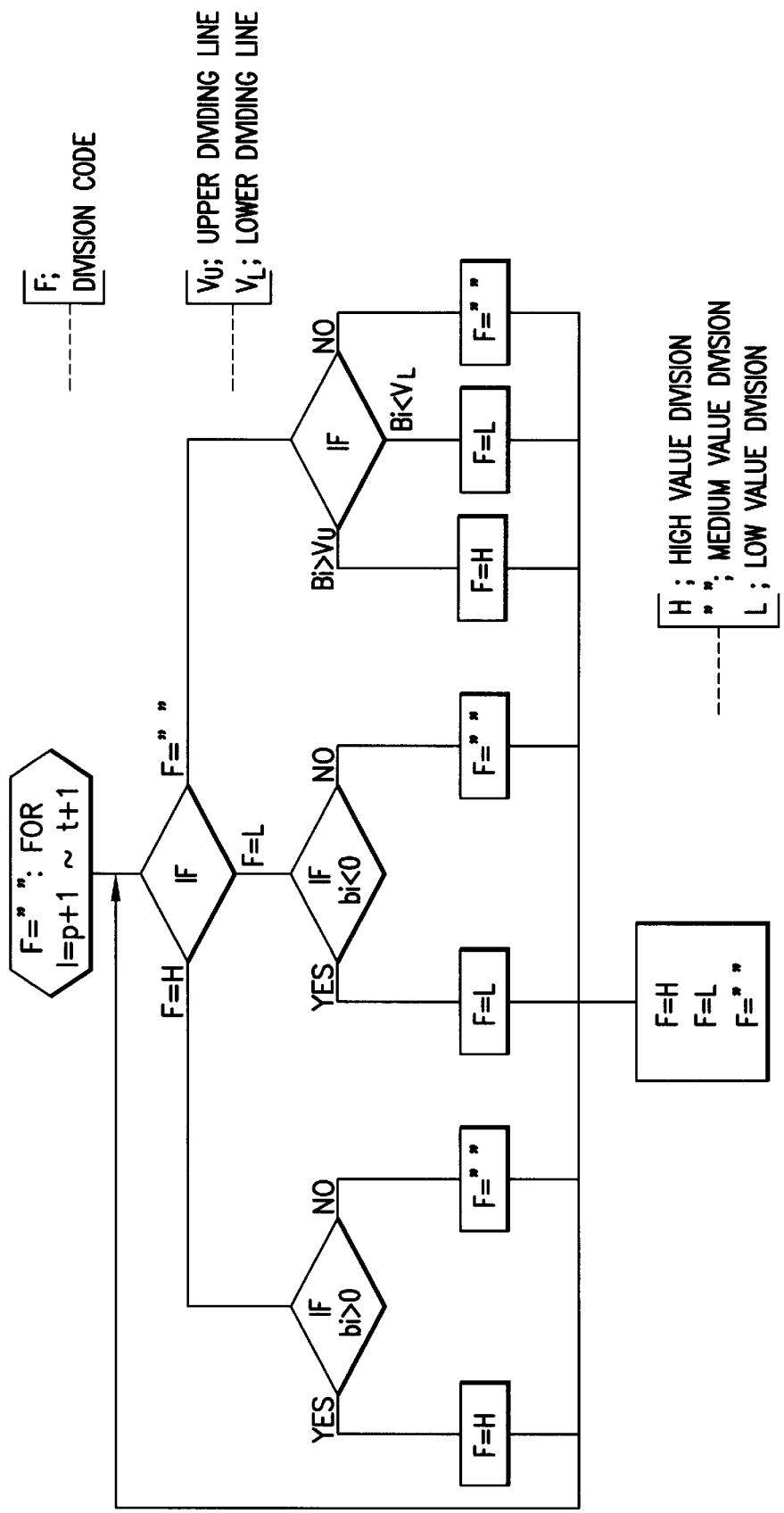
FIG. 15 is a flowchart for determining divisions F.
Figure 16:
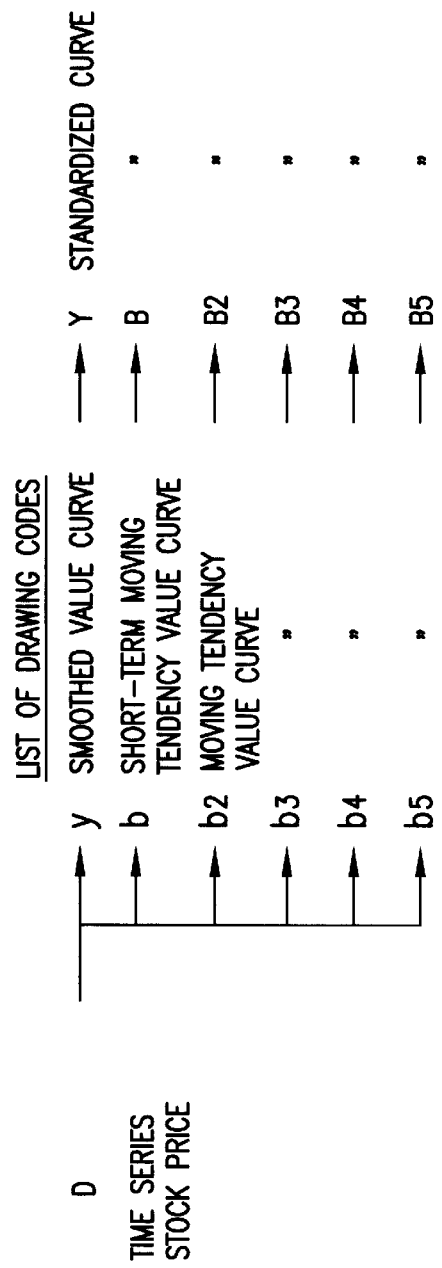
FIG. 16 shows codes and a correlation thereof.

FIG. 15 is a sub-chart showing a flow for distinguishing an upper (lower) division of each moving tendency value curve. In a locus leading to the present point of time with a combination of $\{b2_t, b2_{t-1}, \ldots b2_{2p+1}\}$ curve b2 and $\{B2_t, B2_{t-1}, \ldots B2_{2p+1}\}$ standardized curve B2, a period of time from when the standardized curve B2 exceeds the upper dividing line $V_U$ (lowers below the lower dividing line $V_L$) to increase (decrease), reverses, and decelerates (accelerates) until its tendency value b2 turns to zero is set to a high-value division F2=H (low-value division F2=L) of the standardized curve B2. Then, $\{F2_t, F2_{t-1}, \ldots F2_{2p+1}\}$ time series of division F2 is selected and transmitted to the storage device.

With a combination of a curve b3 and a standardized curve B3, a time series of division F3 is selected and transmitted to the storage device.

With a combination of a curve b4 and a standardized curve B4, a time series of division F4 is selected and transmitted to the storage device.

With a combination of a curve b5 and a standardized curve B5, a time series of division F5 is selected and transmitted to the storage device.

The stock price result time series D, the smoothed stock price y, each tendency value b, b2, b3, b4, b5, each standardized curve B, B2, B3, B4, B5, and the time series of division F, F2, F3, F4, F5 are fetched from the storage device, and recombined in a format comprising (D+y+b+b2+b3+b4+b5+B+B2+B3+B4+B5+F+F2+F3+F4+F5) for every point of time. Following the time series till the present point of time, output is successively transmitted to the storage device and an output device.

Figure 14B:
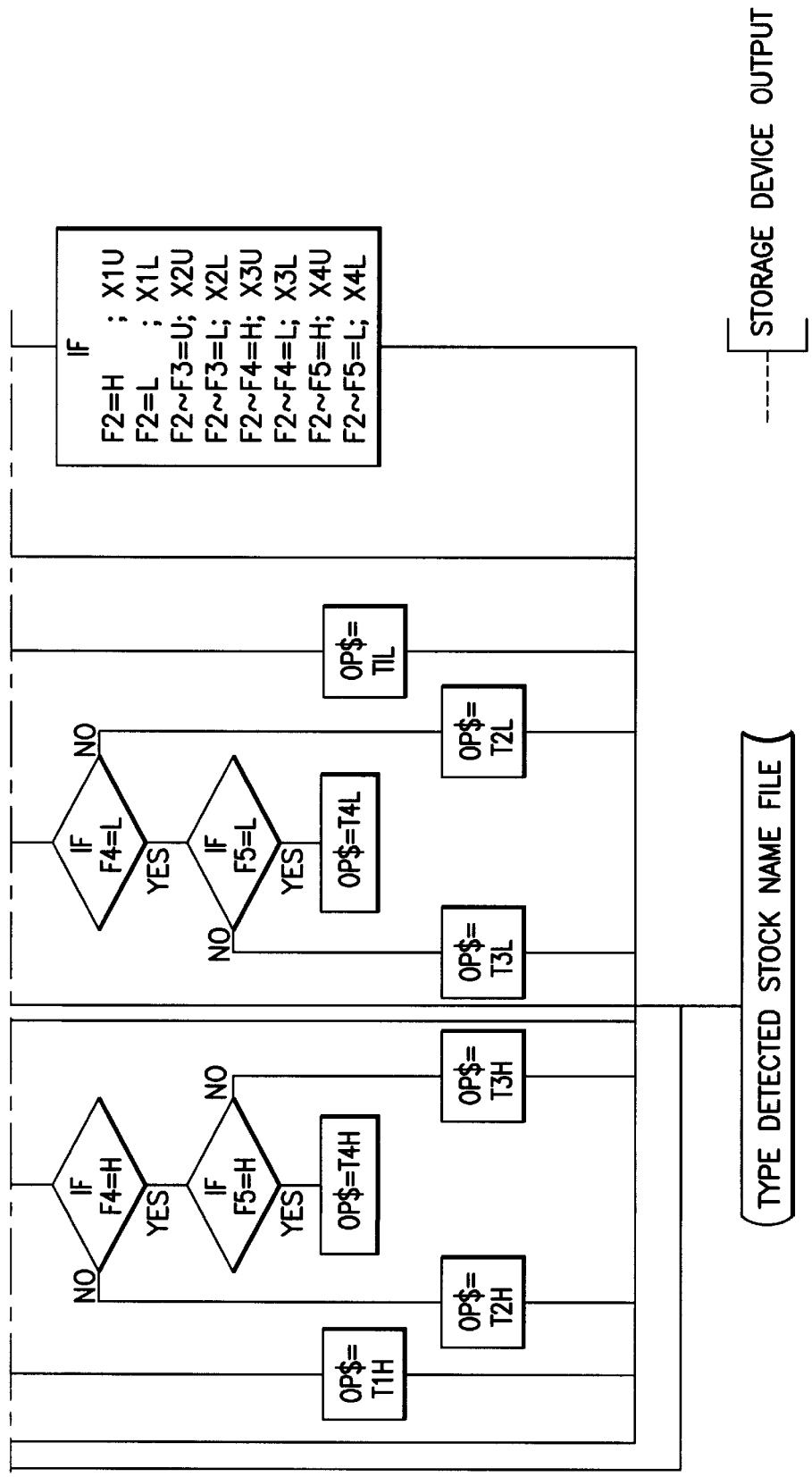
FIG. 14 is a flowchart for selecting stock names having the approach signal or stock names having the extreme values by period of time.

FIG. 14 is a sub-chart showing a process for detecting a ascending (descending) period until the current value $D_{t+1}$ is reached. The magnitude of value difference until the stock price reaches the extreme value depends on the length of the ascending (descending) period from when the ascending (descending) angle exceeds a standard. For the stock name detected with the approach signal $T_U(T_L)$, when the last term of the successive output process is F2=H(L), OP\$=$T_U(T_L)$ is converted to OP\$=T1U(T1L), and a period until the current value is reached is p or more, the stock name is an advanced (declined) stock name. In case of F2, F3=H(F2, F3=L), OP\$=T1U(T1L) is converted to OP\$=T2U(T2L), the period until the current value is reached is 2p or more, and the stock name is an advanced(declined) stock name. In case of F2, F3, F4=H(F2, F3, F4=L), OP\$=T2U(T2L) is converted to OP\$=T3U(T3L), the period until the current value is reached is 4p or more, then the stock name is an advanced (declined) stock name. In case of F2, F3, F4, F5=H(F2, F3, F4=L), OP\$=T3U is converted to OP\$=T4U, the period until the current value is reached is 8p or more, then the stock name is transmitted as an advanced (declined) stock name immediately before the extreme value to the storage device and the output device.

For the stock name detected with the extreme value signal $X_U(X_L)$, when the last term of the successive output process is F2=H(L), OP\$=$X_U(X_L)$ is converted to OP\$=X1U(X1L), and period until the current value is reached is p or more, the stock name is an advanced (declined) stock name. In case of F2, F3=H(F2, F3=L) simultaneously, OP\$=X1U(X1L) is converted to OP\$=X2U(X2L), the period until the current value is reached is 2p or more, and the stock name is an advanced (declined) stock name. In case of F2, F3, F4=H (F2, F3, F4=L) simultaneously, OP\$=X2U(X2L) is converted to OP\$=X3U(X3L), the period until the current value is reached is 4p or more, and the stock name is an advanced (declined) stock name. In case of F2, F3, F4, F5=H(F2, F3, F4, F5=L), OP\$=X3U(X3L) is converted to OP\$=X4U (X4L), the period until the current value is reached is 8p or more, and the stock name is transmitted as an advanced (declined) stock name having the extreme value to the storage device and the output device.

The aforementioned detecting process is repeated for all the stock names. The stock name detected with the signal T1U, T2U, T3U, T4U indicating the current value before the extreme value is transmitted to the new edited file in the storage device. The stock name detected with the signal T1L, T2L, T3L, T4L before the extreme value is transmitted to the another new edited file in the storage device. The stock name detected with the extreme value signal X1U, X2U, X3U, X4U is transmitted to the another new edited file of the stock names having the upper extreme values in the storage device. The stock name detected with the extreme value signal X1L, X2L, X3L, X4L is transmitted to the another new edited file of the stock names having the lower extreme values in the storage device. When there are detected stock names in each file, facsimile, Internet or another communication device is operated to distribute the information to the investors or other specified persons.

Figure 1:
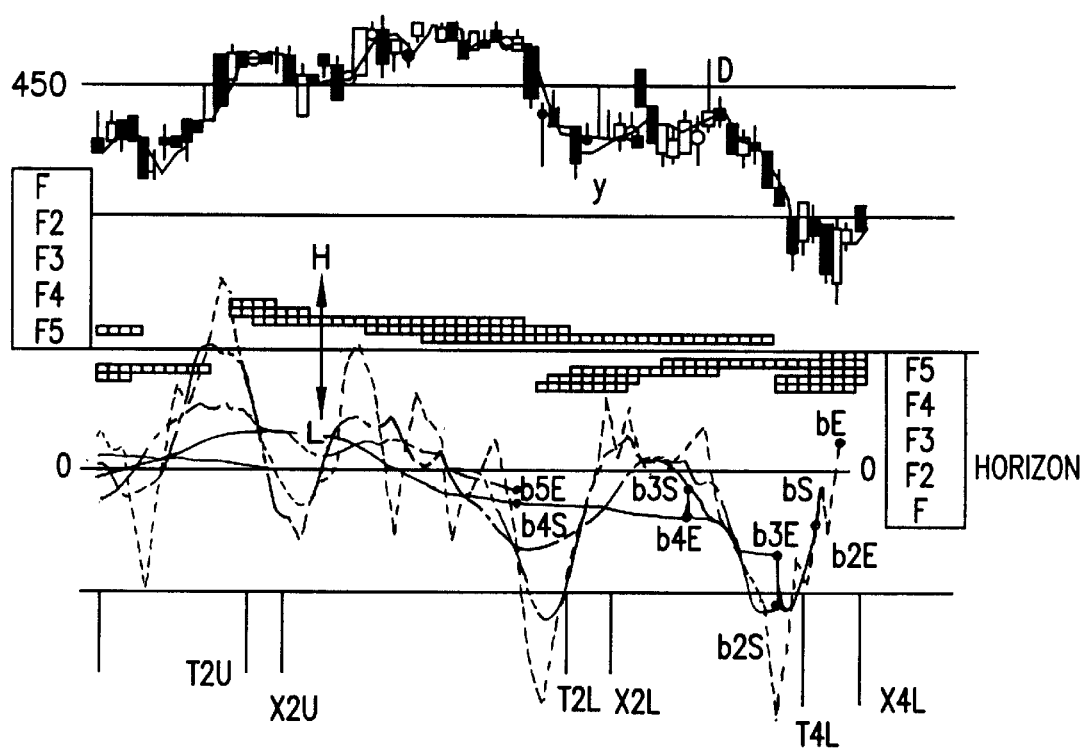
FIG. 1 shows a progress report of detection of a stock name having the extreme current value as distributed data.
Figure 2:
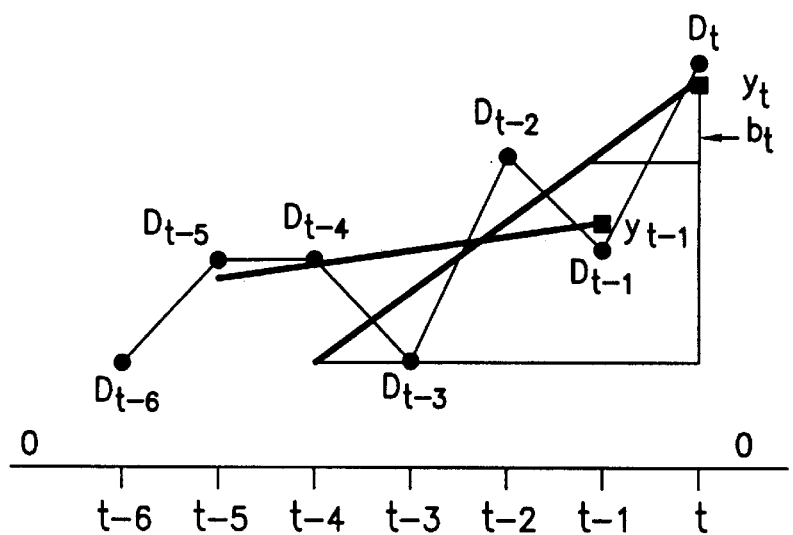
FIG. 2 is an explanatory view showing a correlation of a smoothed value y and a short-term moving tendency value b (differential coefficient) in a stage for smoothing a raw time series numeric value D.
Figure 3:
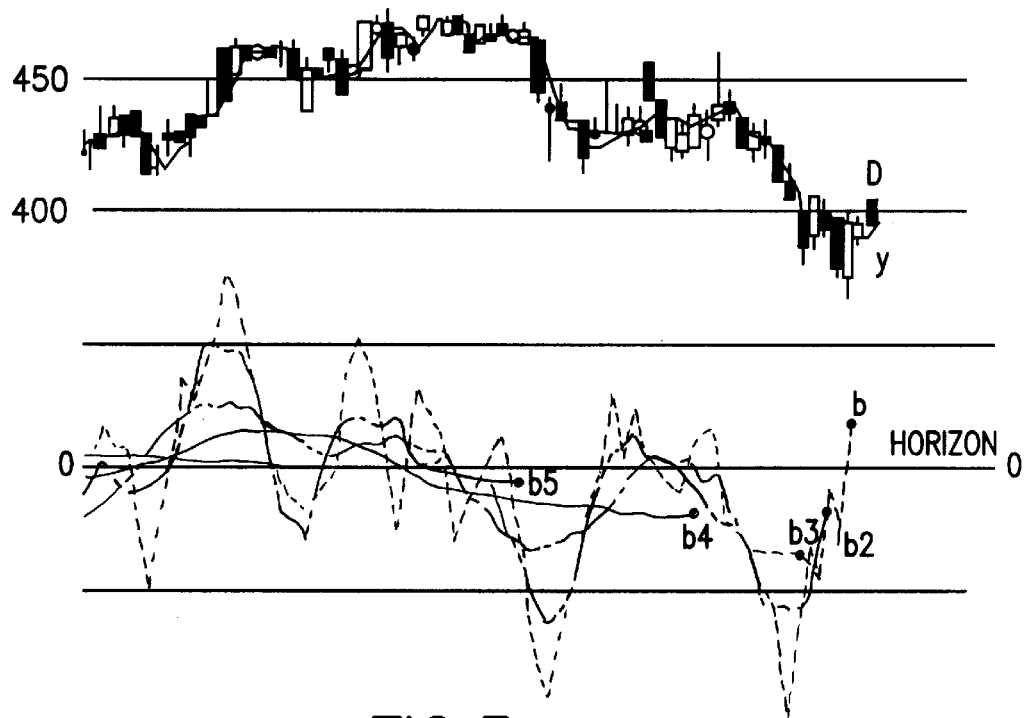
FIG. 3 is a view showing a relationship of stock prices and moving tendency values calculated from a short-term interval to $5^{th}$ interval.
Figure 4:
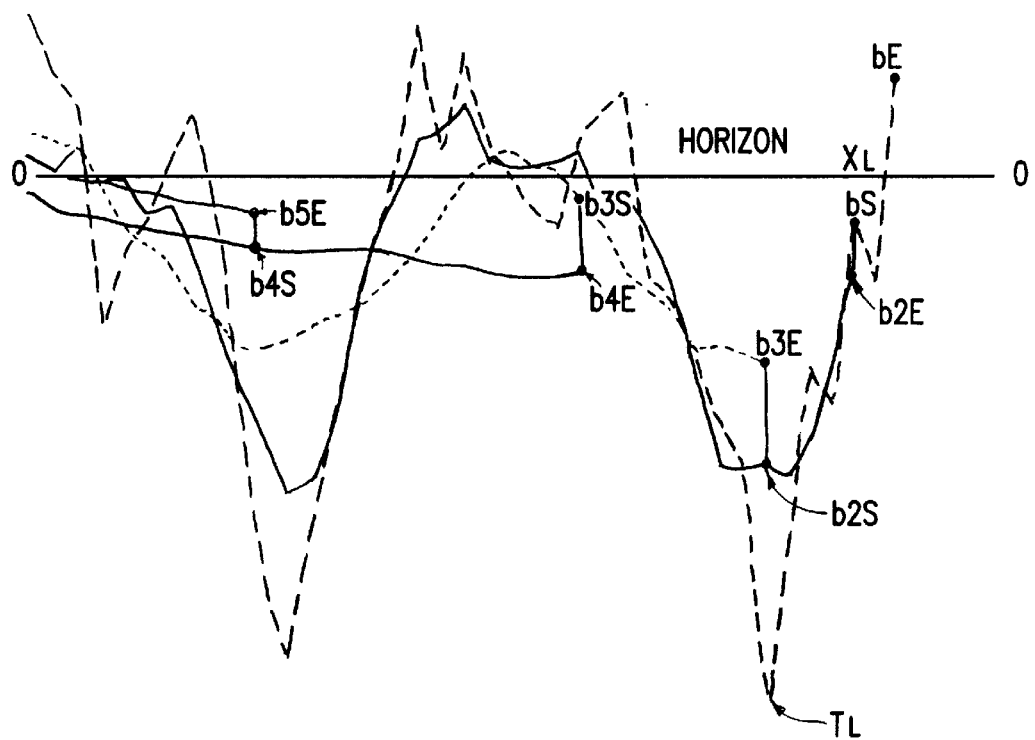
FIG. 4 is an enlarged view of a related part of the moving tendency values of FIG. 3.
Figure 5:
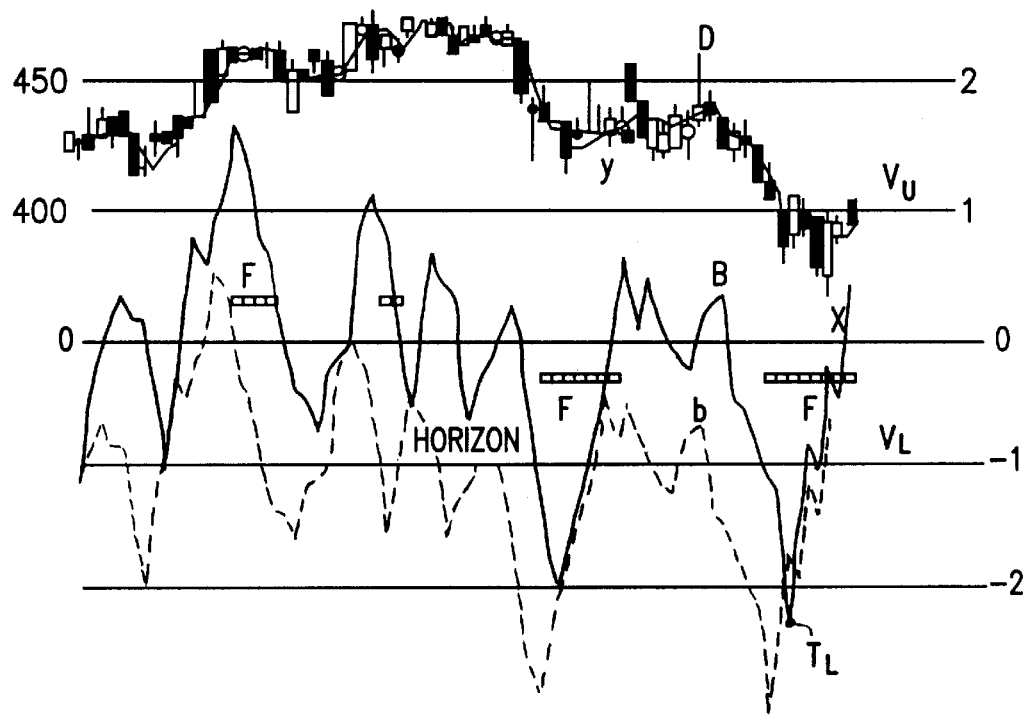
FIG. 5 is an explanatory view showing a correlation of a smoothed value curve y, short-term moving tendency value curve b, standardized curve B and division code F.
Figure 6:
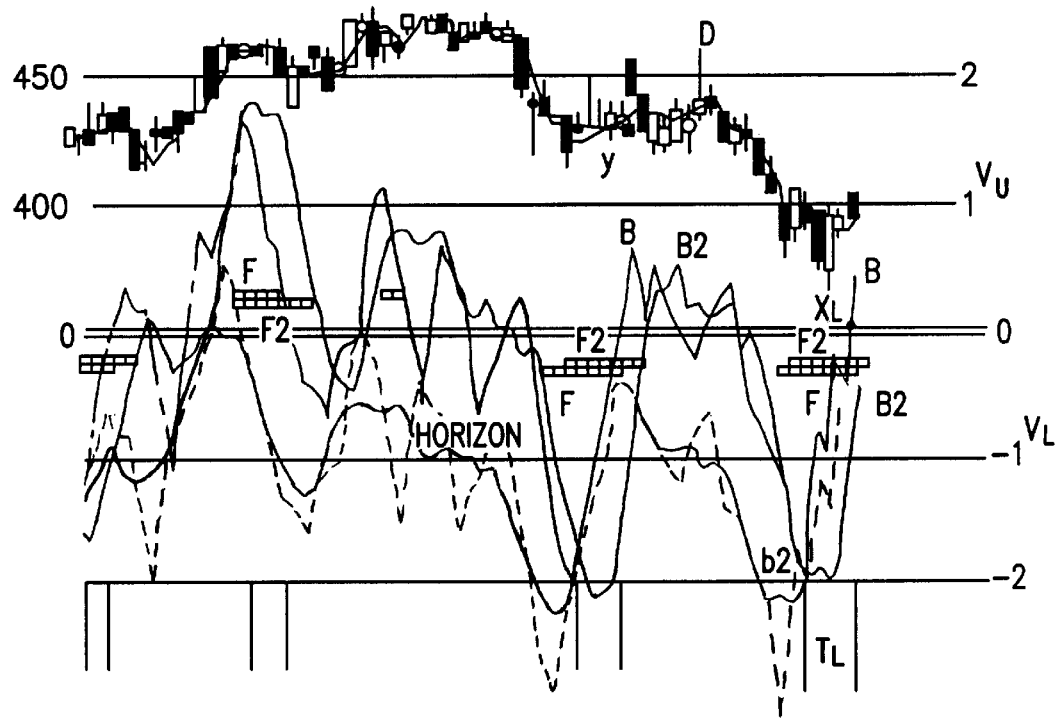
FIG. 6 is an explanatory view of the correlation formed by adding a tendency value curve b2, standardized curve B2 and division code F2 to FIG. 5.
Figure 7:
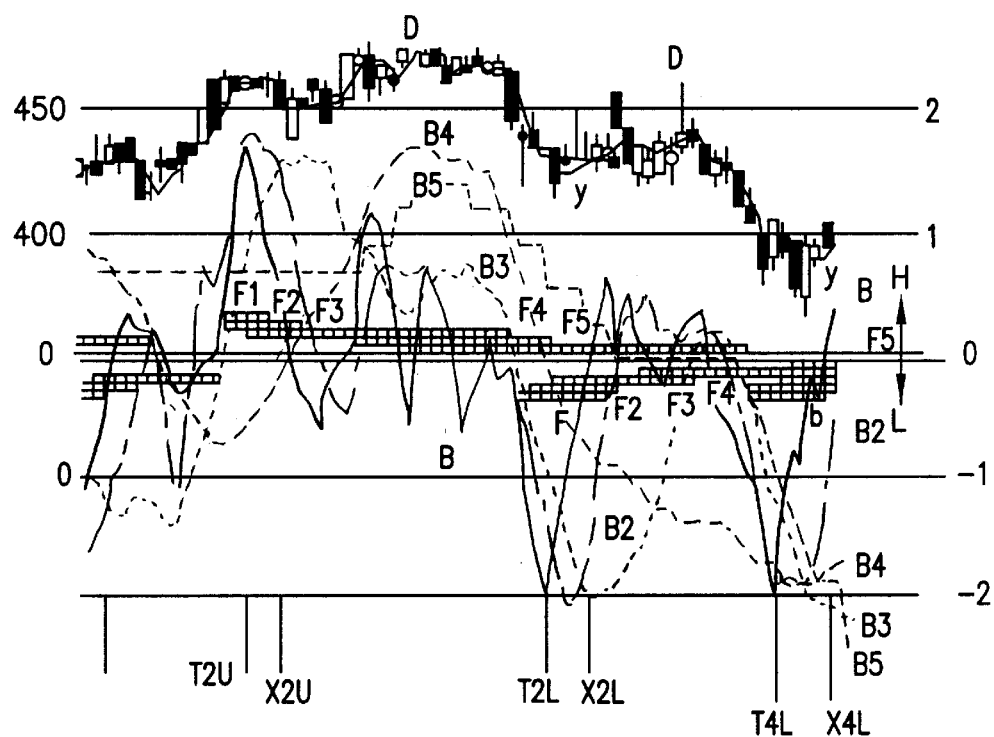
FIG. 7 is an explanatory view showing a correlation of a stock price, standardized curves B to B5, division codes F to F5, approach signals, and extreme value signals.

FIG. 1 shows distributed data of stock extreme value detection, and shows an example of a detected stock name having the lower extreme price with the current value of X4L, i.e., descending trend of 8p=32 days or more. When going back four days, the approach signal T4L is detected, and the investor receives the report to start studying. The noteworthy period of time of the stock name is from the approach signal to the extreme value signal.

Figure 8:
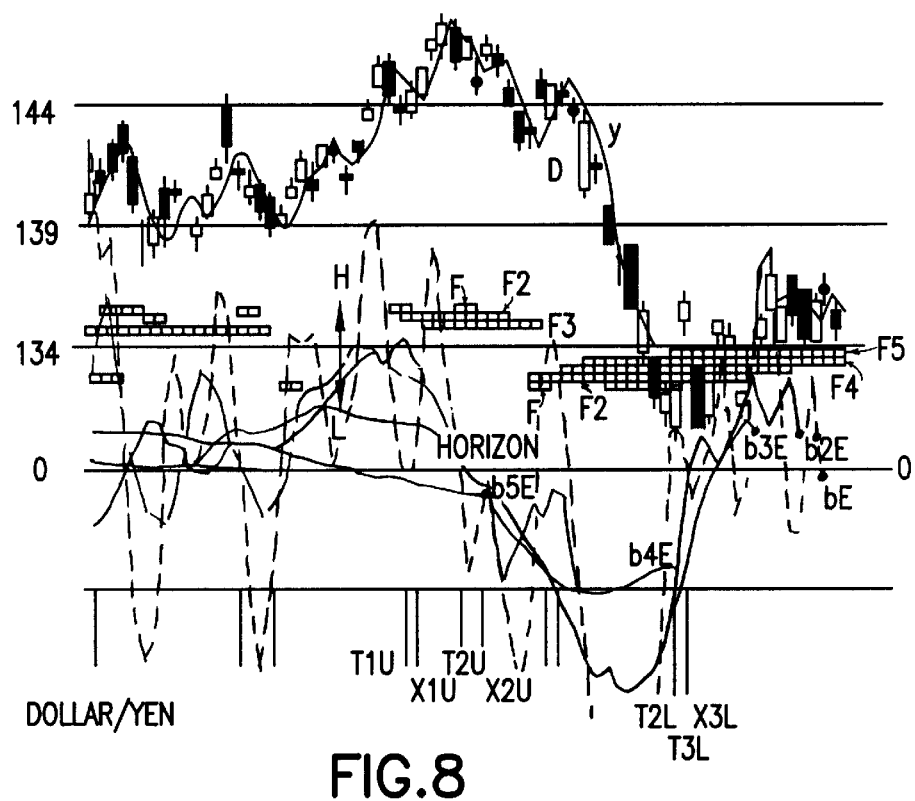
FIG. 8 shows a progress report of detection of a stock name having the extreme current value as an example of distributed data of an exchange market.

FIG. 8 shows an example applied to dollar/yen quotation in the exchange market. Immediately after the approach signal T2L, T3L is detected, the extreme value signal X3L, i.e., the lowest value with descending trend of 4p=16 days or more is detected. Thereafter, the quotation slightly bounces back and is fluctuating. The current value is not a detection object.

Figure 9:
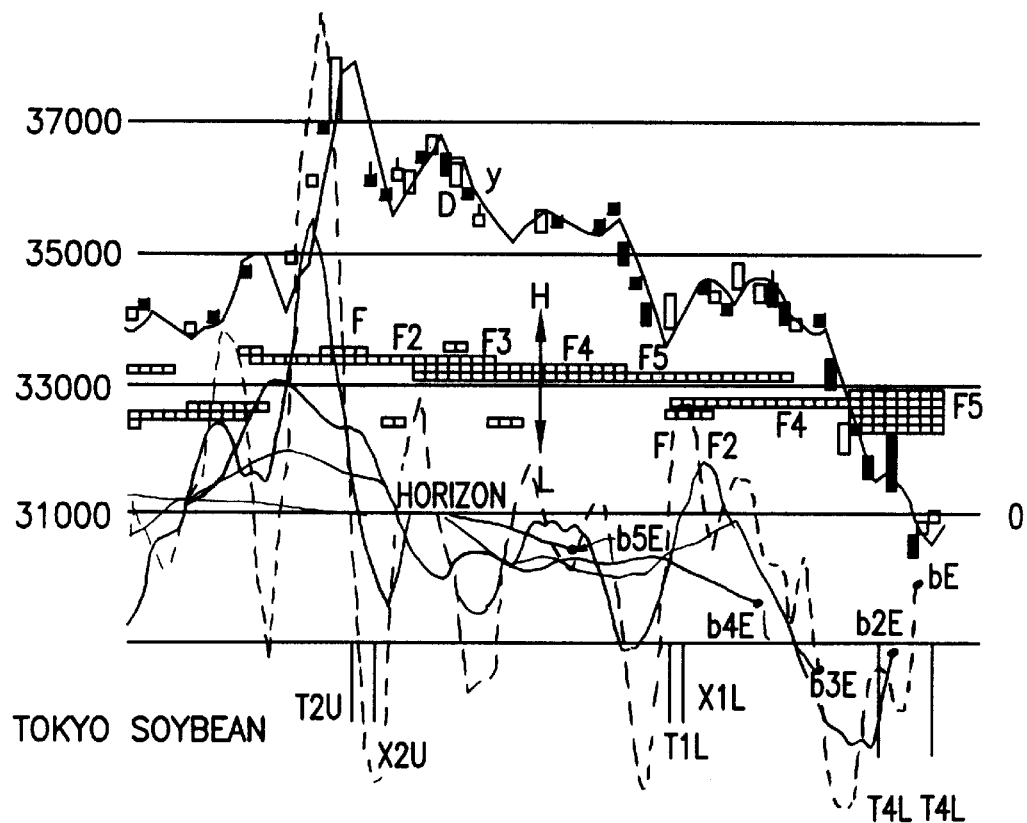
FIG. 9 shows a progress report of detection of a stock name having the extreme current value as an example of distributed data for a merchandise market.

FIG. 9 shows an example applied to Tokyo soybean market outlook in the merchandise market. Since the signal T4L is detected immediately before the extreme value, i.e., the lowest value with a descending trend of 8p=32 days or more, and bE is going to cross a horizontal line, there is a high possibility of detecting the extreme value signal X4L tomorrow.

In the conventional researches, it is almost impossible to predict future stock prices from the stock price time series results (Reference Documents 2, 3). Under the circumstances that the future of the stock prices cannot be predicted by the technical analysis, an effective investment attitude is to buy a stock name whose current value drops to its bottom and sell the stock name at the present point of time when the current value reaches its highest value. According to the present invention, it is also possible to grasp from the stock names immediately before the current values reach extreme values to the stock names having the extreme values at the present point of time, and investing in the market.

To provide the investors with the group of stock names selected/grasped from more than 3000 domestic stock names and stock names traded in the other markets means for the investors to place all the stock names under monitoring with a limited number of selected stock names.

What is claimed is:

1. A method of detecting stock names in which current values indicate extreme values or values immediately before the extreme values, comprising:

a) a preparation process in which a short-term moving tendency value time series b derived with a short-term interval p+1 from a stock price result time series D fetched from a storage device and a standardized time series B are calculated and transmitted to the storage device;

b) a process for primary selection of stock names immediately before short-term extreme values in which a short-term tendency value $b_{t+1}$ derived with the short-term interval p+1 from time series numeric values D obtained by adding a current value $D_{t+1}$ to a last term of stock price results leading to the current value of a stock name fetched from said storage device via an input device, and a standardized value $B_{t+1}$ are calculated, a signal OP\$=$T_U$ is detected when standardized values B have a relationship of $B_{t-1}<B_t>B_{t+1}$, $B_t$ exceeds an upper dividing line $V_U$ and its locus is a returning point of a convex, a signal OP\$=$T_L$ is detected when $B_{t-1}>B_t<B_{t+1}$, $B_t$ lowers below a distinguishing line $V_L$ and its locus is a returning point of a concave, and when no signal is detected OP\$=" " is transmitted to said stock names in said storage device;

c) a process for primary selection of stock names having the short-term extreme values in which when the signal immediately before the extreme value OP\$=$T_U$, OP\$=$T_L$ is detected before the present point of time, a stock name not yet having the extreme value is detected, a short-term moving tendency value curve b cuts a horizontal line at OP\$< >" " fetched from the storage device, an upper extreme value OP\$=$X_U$ in case of OP\$=$T_U$ or a lower extreme value OP\$=$X_L$ in case of OP\$=$T_L$ is transmitted to said stock name in said storage device;

d) a process in which a curve b2 of moving tendency value b2 derived with an interval 2p+1 from the stock price result time series D and a standardized curve B2 of standardized/converted value B2 are calculated and transmitted to said storage device, and in the same procedure a curve b3, b4, b5 of moving tendency value b3, b4, b5 derived with an interval 4p+1, 8p+1, 16p+1 and a standardized curve B3, B4, B5 are calculated and transmitted to said storage device;

e) a process for selection of time series F in which a period from when each standardized curve B, B2, B3, B4, B5 exceeds the upper dividing line Vu, increases, reverses and decelerates until each tendency value b, b2, b3, b4, b5 turns to zero is set as a high-value division F, F2, F3, F4, F5=H of each standardized curve B, B2, B3, B4, B5, and a period from when each standardized curve B, B2, B3, B4, B5 lowers below the lower dividing line VL, decreases, reverses and accelerates until each tendency value b, b2, b3, b4, b5 turns to zero is set as a low-value division F, F2, F3, F4, F5=L of each standardized curve B, B2, B3, B4, B5;

f) a successive output process in which the stock price result time series D, a smoothed stock price y, each tendency value b, b2, b3, b4, b5, each standardized curve B, B2, B3, B4, B5 and the time series F, F2, F3, F4, F5 of the division F are fetched from said storage device, recombined in a format comprising $D_t+y_t+b_t+b2_t+b3_t+b4_t+b5_t+B_t+B2_t+B3_t+B4_t+B5_t+F_t+F2_t+F3_t+F4_t+F5_t$ for every point of time, and successively transmitted to said storage device and an output device following a time series t=1 to t+1 till the present point of time;

g) an output process in which for the stock name primarily detected with the signal Tu immediately before the extreme value, when the last term of the successive output process is F2=H, OP\$=$T_U$ is converted to OP\$=T1U, and period until the current value is reached is p or more, the stock name is transmitted as an advance stock name, in case of F2, F3=H, OP\$=T1U is converted to OP\$=T2U, the period until the current value is reached is 2p or more and the stock name is transmitted as an advance stock name, in case of F2, F3, F4=H, OP\$=T2U is converted to OP\$=T3U, the period until the current value is reached is 4p or more and the stock name is transmitted as an advance stock name, or in case of F2, F3, F4, F5=H, OP\$=T3U is converted to OP$=T4U, the period until the current value is reached is 8p or more and the stock name is transmitted as an advanced stock name immediately before the upper extreme value to said stock name in said storage device and the output device;

h) an output process in which for the stock name primarily detected with the signal TL immediately before the extreme value, when the last term of the successive output process is F2=L, OP$=TL is converted to OP$=T1L, and the period until the current value is reached is p or more, the stock name is transmitted as a decline stock name, in case of F2, F3=L, OP$=T1L is converted to OP$=T2L, the period until the current value is reached is 2p or more and the stock name is transmitted as a decline stock name, in case of F2, F3, F4=L, OP$=T2L is converted to OP$=T3L, the period until the current value is reached is 4p or more and the stock name is transmitted as a decline stock name, or in case of F2, F3, F4, F5=L, OP$=T3L is converted to OP$=T4L, the period until the current value is reached is 8p or more and the stock name is transmitted as a stock name immediately before the lower extreme value to said stock name in said storage device and the output device;

i) an output process in which for the stock name primarily detected with the extreme value signal $X_U$, when the last term of the successive output process is F2=H, OP$=$X_U$ is converted to OP$=X1U, and the period until the current value is reached is p or more, the stock name is transmitted as an advance stock name, in case of F2, F3=H, OP$=X1U is converted to OP$=X2U, the period until the current value is reached is 2p or more and the stock name is transmitted as an advance stock name, in case of F2, F3, F4=H, OP$=X2U is converted to OP$=X3U, the period until the current value is reached is 4p or more and the stock name is transmitted as an advance stock name, or in case of F2, F3, F4, F5=H, OP$=X3U is converted to OP$=X4U, the period until the current value is reached is 8p or more and the stock name is transmitted as a stock name having the upper extreme value to said stock name in said storage device and the output device; and j) an output process in which for the stock name detected with the extreme value signal $X_L$, when the last term of the successive output process is F2=L, OP$=XL is converted to OP$=X1L, and the period until the current value is reached is p or more, the stock name is transmitted as a decline stock name, in case of F2, F3=L, OP$=X1L is converted to OP$=X2L, the period until the current value is reached is 2p or more and the stock name is transmitted as a decline stock name, in case of F2, F3, F4=L, OP$=X2L is converted to OP$=X3L, the period until the current value is reached is 4p or more and the stock name is transmitted as a decline stock name, or in case of F2, F3, F4, F5=L, OP$=X3L is converted to OP$=X4L, the period until the current value is reached is 8p or more and the stock name is transmitted as a stock name having the lower extreme value to said stock name in said storage device and the output device.

2. A computer readable recording medium in which a program is recorded for performing a method comprising:

a) a process of inputting current values into read stock value result time series;

b) a process of primarily selecting a stock name detected with an approach signal or a signal having the extreme value OP$=$T_U$, $T_L$, $X_U$, $X_L$ and a non-detected stock name in accordance with a relationship with tendency values $b_{t-1}$ to $b_{t+1}$ and standardized values $B_{t-1}$ to $B_{t+1}$;

c) a process of calculating tendency value time series b to b5, standardized values B to B5, and upper and lower divisions F to F5 of the standardized values, for limiting an ascending/descending period until or immediately before the current value of the detected stock name reaches the extreme value classifying results OP$=X1U to X4U, X1L to X4L, T1U to T4U, T1L to T4L by period, and transmitting the results to each file in a storage device; and d) a process of, after all the stock names are processed and the detected stock name is in each file of the storage device, outputting and distributing the stock name and detection progress to an investor or another specified person.

3. A device for selecting a stock name whose current value is an extreme value or immediately before the extreme value, said device comprising:

a) input means for inputting the current value obtained via information media;

b) storage means for receiving said current value, and recording the current value for each stock name in a time series; and c) arithmetic means for calculating tendency values $b_{t-1}$ to $b_{t+1}$ for a primary selection and standardized values $B_{t-1}$ to $B_{t+1}$ from stock price time series numeric values D of the respective stock names recorded in said time series, detecting an approach signal OP$=$T_U$, $T_L$ immediately before the extreme value when the corresponding stock name is present, and putting a mark OP$=" " indicative of non-correspondence onto the non-corresponding stock name and storing the non-corresponding stock name in said storage means when the corresponding stock name is absent;

said arithmetic means, to detect said stock name whose current value is immediately before the extreme value or the stock name with the extreme value by an ascending/descending period of said current value, calculating, storing in said storage means and successively reading in the time series moving tendency value time series b5, b4, b3, b2, b, standardized values B5, B4, B3, B2, B, and division codes FS, F4, F3, F2, F, performing selection OP$=?, and storing a detection result OP$=in said storage means for each stock name file;

said storage means comprising a file of a group of stock names approaching to upper extreme values, a file of a group of stock names approaching to lower extreme values, a file of a group of stock names having the upper extreme values, and a file of a group of stock names having the lower extreme values, and, after an operation for detecting the corresponding stock name is completed with respect to all the stock names, classifying and storing the respective corresponding stock names in said respective files, said device further comprising:

d) output means for outputting a list of detected stock names and a detection report procedure chart from said respective stock name group files; and e) distribution/transmission means for distributing output results via a communication circuit.

4. A stock price movement forecast method of forecasting that current values of stock names indicate extreme values or approach to the extreme values only in a lamination state of F to F5 division marks, said method comprising:

a) a data preparation process of extracting respective data of stock price time series D, stock price smooth time series y, moving tendency value time series b5, b4, b3, b2, b calculated from said stock price time series, standardized time series B5, B4, B3, B2, B and division time series F5, F4, F3, F2, F calculated from said respective time series from a storage device;

b) a process of displaying a time series chart in which the time series is shown on the abscissa, and said stock price time series D and said stock price smooth value time series y are shown on the ordinate;

c) a process of shifting said moving tendency value time series b5, b4, b3, b2, b on a natural horizontal line by 8P, 4P, 2P, P, ½P time series from said stock price time series D and said stock price smooth value time series y, and displaying the moving tendency value time series on said time series chart;

d) a process of putting an upper and lower value division of the moving tendency value time series b5, and placing the division time series F5 to be adjacent to a reference line to dispose a mark band, and displaying F5=H (F5=L) above (below) said reference line with a predetermined mark in accordance with said stock price time series D and said stock price smooth value time series y on said time series chart;

e) a process of putting an upper and lower value division of the moving tendency value time series b4, and placing the division time series F4 to be adjacent to the reference line to dispose the mark band, and displaying F4=H (F4=L) above (below) said reference line with the predetermined mark in accordance with said stock price time series D and said stock price smooth value time series y on said time series chart;

f) a process of putting the upper and lower value division of the moving tendency value time series b3, and placing the division time series F3 to be adjacent to the reference line to dispose the mark band, and displaying F3=H (F3=L) above (below) said reference line with the predetermined mark in accordance with said stock price time series D and said stock price smooth value time series y on said time series chart;

g) a process of putting the upper and lower value division of the moving tendency value time series b2, and placing the division time series F2 to be adjacent to the reference line to dispose the mark band, and displaying F2=H (F2=L) above (below) said reference line with the predetermined mark in accordance with said stock price time series D and said stock price smooth value time series y on said time series chart;

h) a process of putting the upper and lower value division of the moving tendency value time series b, and placing the division time series F to be adjacent to the reference line to dispose the mark band, and displaying F=H (F=L) above (below) said reference line with the predetermined mark in accordance with said stock price time series D and said stock price smooth value time series y on said time series chart;

i) a process of outputting said standardized time series B5, B4, B3, B2, B and said division time series F5, F4, F3, F2, F, and displaying upper (lower) value approach marks classified by a magnitude, in an area above an upper dividing line $V_t$ (below a lower dividing line $V_L$), in an approach signal T1U (T1L) in case of $B_{t-2}<B_{t-1}>B_t$ ($B_{t-2}>B_{t-1}<B_t$) and $F2_t=H$ ($F2_t=L$), an approach signal T2U (T2L) in case of $F2_t, F3_t=H$ ($F2_t, F3_t=L$), an approach signal T3U (T3L) in case of $F2_t, F3_t, F4_t=H$ ($F2_t, F3_t, F4_t=L$), and an approach signal T4U (T4L) in case of $F2_t, F3_t, F4_t, F5_t=H$ ($F2_t, F3_t, F4_t, F5_t=L$), respectively;

j) a process of outputting said moving tendency value time series b, said standardized time series B and said division time series F5, F4, F3, F2, F, and displaying upper (lower) extreme value marks classified by the magnitude in corresponding extreme value signal X1U (X1L), X2U (X2L), X3U (X3L), X4U (X4L), respectively, when said moving tendency value time series b cut the horizontal line, that is, in case of SIG $(b_{t-1})< >SIG(b_t)$ and $F2_t=H$ ($F2_t=L$), in case of $F2_t, F3_t=H$ ($F2_t, F3_t=L$), in case of $F2_t, F3_t, F4_t=H$ ($F2_t, F3_t, F4_t=L$) and in case of $F2_t, F3_t, F4_t, F5_t=H$ ($F2_t, F3_t, F4_t, F5_t=L$);

k) a process of confirming moving tendency value curves (to b5E)→(b4S to b4E)→(b3S to b3E)→(b2S to b2E) →(bS to bE) synthesized from said moving tendency value time series b, b2, b3, b4, b5 as the moving tendency value curves of said stock price time series D and said stock price smooth value time series y;

l) a process of reading a stock price behavior only with a combination of $F_t$ to $F5_t$ upper (lower) value marks appearing a last term division mark area, that is, forecasting that a stock price is descending consistently for an 8P period at minimum when the $F_t$ to $F5_t$ marks are laminated and displayed below said reference line and that the stock price is a lowered extreme value consistently for a 4P period at minimum when the $F_t$ lower value mark disappears and the $F2_t$ to $F4_t$ marks are laminated and displayed below said reference line; and m) a process of forecasting the stock price behavior based on the divisions and magnitudes of said approach marks or said extreme value marks.

* * * * *